C. S. BULKLEY.
MEANS FOR OBVIATING DIFFICULTIES ARISING FROM DEFECTIVE
INSULATION IN TELEGRAPHS.
No. 8,321.　　　　　　　　　　Patented Aug. 26, 1851.
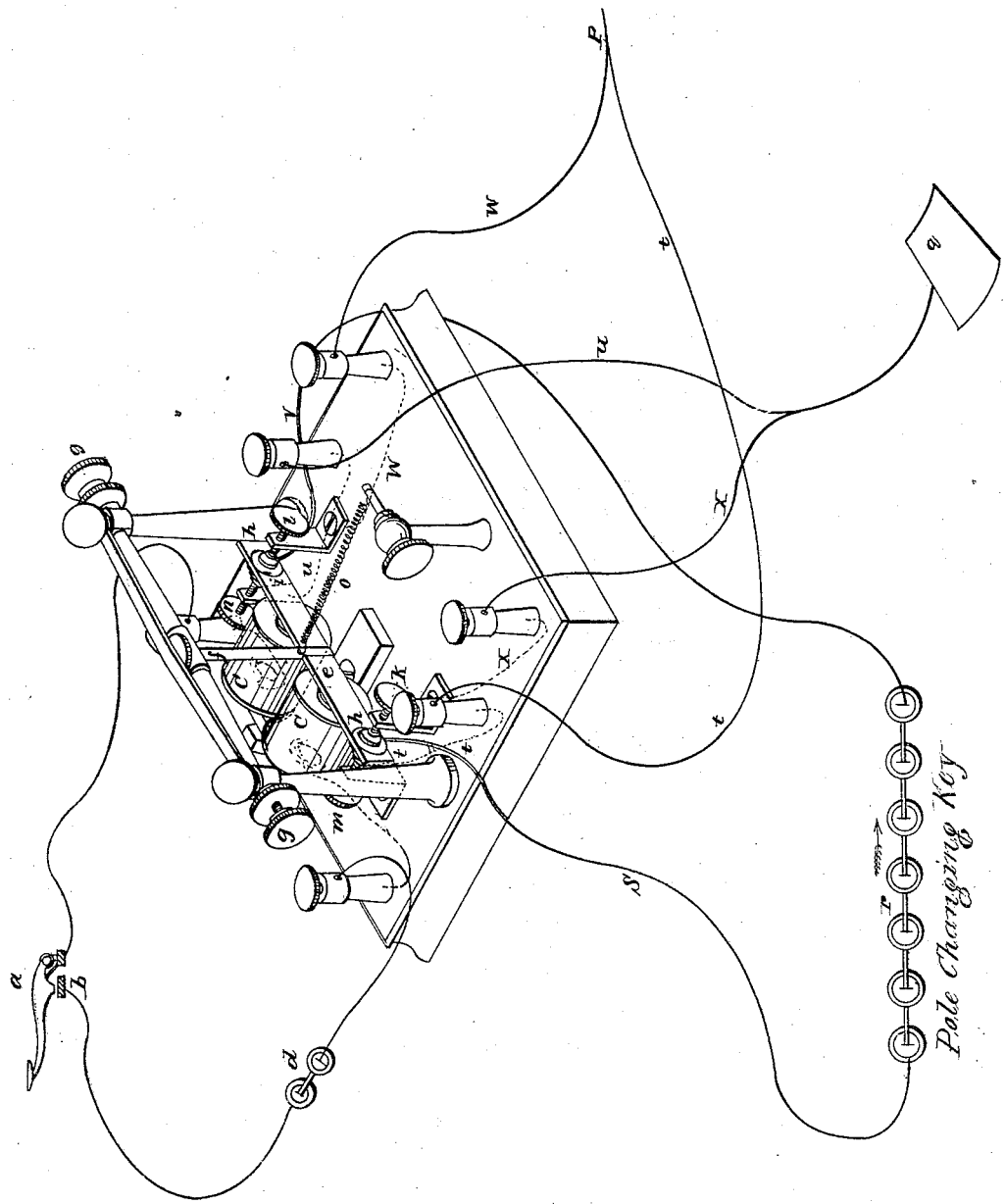

UNITED STATES PATENT OFFICE.

CHAS. S. BULKLEY, OF MACON, GEORGIA.

IMPROVEMENT IN MEANS FOR OBVIATING DIFFICULTIES ARISING FROM DEFECTIVE INSULATION IN TELEGRAPHS.

Specification forming part of Letters Patent No. 8,321, dated August 26, 1851.

*To all whom it may concern:*

Be it known that I, CHARLES S. BULKLEY, of Macon, in the county of Bibb and State of Georgia, have invented certain Improvements in the Mode of Operating Electric Telegraphs; and I do hereby declare that the following is a full, clear, and exact description of the principle or character which distinguishes them from all other things before known, and of the usual manner of making, modifying, and using the same, reference being had to the accompanying drawing, which is a perspective view of the instrument used, called a "pole-changing key," and showing the arrangement of the battery-wires, &c.

The imperfect insulation of telegraph-wires running from place to place, especially in wet or damp weather, is a source of much annoyance in working telegraphs, and in the best of weather requiring powerful batteries at each end of a line to overcome its effects. Suppose, for explanation, a line, during wet weather, in which the insulation is so bad as to allow a part of the electric current to pass down one or more of the posts, and thus complete a circuit with the ground. In such a case, when the circuit is broken at one end, in order to commence a communication, the receiving-magnet at the other end remains closed in consequence of a part of the current proceeding from the battery at that end escaping down the posts and completing a circuit, which is sufficient to keep the armature of the receiving-magnet from falling back, and thus the attempt to send a communication is frustrated and the line remains inoperative.

In order to overcome this difficulty, and to counteract the effects of bad insulation, and also to produce a more prompt and certain action of the armature of the receiving-magnet, I make use of the well-known effect of two equal batteries when placed with their poles in reverse directions in the same circuit, which is to counteract each other and to destroy any current proceeding from either. For this purpose I employ, in connection with the operator's key, an apparatus by which the direction of the current proceeding from the main battery at the same station is reversed whenever the key is operated—that is, when the key is pressed down the current is made to pass from the zinc pole of the battery through the main wire to the other station and operate in conjunction with the current of the battery there, the poles of which are placed in the same direction, and thereby closing the local circuit there; but when the key is permitted to rise the battery at the former station is reversed and the platina pole put in connection with the main wire, and thus the two batteries are acting in opposition to each other and the current through the main wire is wholly destroyed, which allows the armature of the receiving-magnet to fall back and break the local circuit at the distant station. Thus the action of the receiving-magnet is insured under circumstances of imperfect insulation, which would prevent its operation if the circuit was merely broken at the other end, as has hitherto been practiced.

The drawing represents the instrument employed in connection with the ordinary key, and also the disposition of the wires and battery.

*a* is an ordinary key, with its anvil *b* for making and breaking a circuit through the coils of a magnet, *c*, and the small battery *d*.

*e* is the armature, which is suspended by a swivel-joint, *f*, working on the points of the screws *g*. Studs of metal *h h'* pass through the ends of the armature *e*, and are insulated from it by collars of ivory *i i'*, which surround them. The studs on the armature vibrate between the points of the screws *k l m n*.

*o* is the spring which draws back the armature when not attracted to the magnet.

*p* is the main wire leading to the distant station; *q*, the ground-plate, and *r* the main battery, with the platina pole in the direction of the arrow.

The swivel-joint *f* of the armature is in order to allow the studs to strike the ends of the screws on the same side simultaneously.

When the key *a* is pressed down the magnet *c* attracts its armature *e*, and the studs are then in contact with the screws *m* and *n*, which closes a circuit proceeding from the zinc end of the battery *r* through the wire *s*, connected with the stud *h*, and then through the screw *m* and wires *t* to the main wire *p*, and returning through the ground to the plate *q*, the wire *u*, the screw *n*, the stud *h'*, and the wire *v* to the platinum pole of the battery *r*, which is thus acting in conjunction with the battery at the distant station. When the key $a$ is up and the current through the coil of the magnet $c$ is broken the armature $e$ falls back and the studs come in contact with the screws $k$ and $l$, which cause the current to flow from the platina pole, through the wire $v$, the stud $h'$, the screw $l$, and the wire $w$ to the main wire $p$, and back through the ground and ground-plate $q$, the wires $x$, the screw $k$, the stud $h$, and the wire $s$ to the battery, thus placing the poles of the battery $r$ in opposition to the battery at the distant station and causing their currents to counteract each other, and producing the same effect on the receiving-magnet as a broken circuit on a perfectly-insulated line.

Having thus fully described my improvements in the working of telegraphs, what I claim as new therein, and desire to secure by Letters Patent, is—

Reversing the connection of the main wire with the poles of the battery, so that the battery acts in opposition to the battery at the other end of the line in the intervals between the contacts made by the key in writing (in place of merely breaking the circuit) by means of the apparatus and arrangement of wires, batteries, &c., substantially as above described, for the purpose of counteracting the effects of imperfect insulation, as set forth.

CHAS. S. BULKLEY.

Witnesses:
PATRICK CROWN,
DANIEL F. CLARKE,
E. E. BROWN.